United States Patent [19]
Zeitz

[11] Patent Number: 4,631,529
[45] Date of Patent: Dec. 23, 1986

[54] ELECTRO-OPTICAL FLUID DETECTOR

[75] Inventor: Vernon Zeitz, Springfield, Vt.

[73] Assignee: Ivek Corporation, Springfield, Vt.

[21] Appl. No.: 661,638

[22] Filed: Oct. 17, 1984

[51] Int. Cl.⁴ ............................................. G08B 21/00
[52] U.S. Cl. .................................... 340/619; 250/573;
340/606
[58] Field of Search ............... 340/619, 603, 608, 609,
340/606; 250/573; 604/65, 66, 67, 30

[56] References Cited
U.S. PATENT DOCUMENTS

| | | | |
|---|---|---|---|
| 4,210,138 | 7/1980 | Jess et al. | 604/67 |
| 4,213,454 | 7/1980 | Shim | 604/65 |
| 4,280,495 | 7/1981 | Lampert | 604/67 X |
| 4,312,341 | 1/1982 | Zissimopoulos et al. | 604/67 |

Primary Examiner—Charles A. Ruehl
Assistant Examiner—Daniel Myer
Attorney, Agent, or Firm—John W. Logan, Jr.

[57] ABSTRACT

An electro-optical circuit for detecting fluid in a translucent or a transparent duct or tube, this circuit including an AC activated light emitting diode (LED) for transmitting a narrow beam of light through the tube and a photo transistor detection, sub-circuit activated by the LED light beam, the power to the LED being adjusted to operate the photo transistor of the detection circuit in its unsaturated, active region of operation.

19 Claims, 3 Drawing Figures

ELECTRO-OPTICAL FLUID DETECTOR

BACKGROUND OF THE INVENTION

This invention relates to electro-optical detectors, and especially such electro-optical detectors which detect fluids, these fluids being either opaque, translucent or transparent.

Electro-optical detectors in the past have operated on the principal of detecting a loss of signal from a photo-activated, electrical device (pick-up) which device receives a "light" signal from a light source. An object to be detected interrupts or intercepts a beam of light passing between the light source and pick-up electrical device thereby triggering a loss of signal in the pick-up circuit.

While in early years "electric-eye" type devices were used, in recent years light emitting diodes (LED's) and photo transistors have been incorporated into these devices. Such LED/photo transistor circuits are now made much smaller in size, using much less electrical power, and being commercially available at less cost than their predecessor devices.

Regardless of the type of photo electric source/pickup, i.e. LED/photo transistor or otherwise, problems still remain with existing circuits when used for detecting gas or air bubbles in translucent or transparent, fluids. This has been because light transmission through clear fluids has not been easily distinguishable from light transmission through gas or air, i.e. an empty tube. Further, in such applications the change in signal levels between these prior LED/photo transistor detector circuits have, however, operated satisfactorily with opaque objects. Some applications have been as slot detectors where the LED and photo transistor are spaced approximately ¼ to ½ inch apart with a slotted opaque disk passing therethrough.

These prior LED/photo transistor detector circuits have also satisfactorily operated as drop detectors. However, when used as a drop detector, the circuitry has critically depended upon the leading or trailing edge of a fluid drop or gas bubble to bend or distort the light beam, thereby allowing a detection.

Other light source-detector combinations have also been operated as fluid presence detectors, whereof the presence of a fluid causes a reduction in light transmission between the source and detector. Such circuits, such as spectrophotometers often utilize specific absorption frequencies or quantum effects to determine the presence or absence of materials.

Recent application of LED-phototransistor combinations have not been successful in static or in very slow moving fluidic-gas systems.

These prior electro-optical detector devices have universally operated on the physical assumption that light transmission is diminished when passing through a fluid, whether that fluid is clear or translucent, as opposed to passing through air; and blocked entirely by an opaque object or opaque fluid.

By-in-large the electrical and/or electronic circuitry involved with these prior electro-optical detector circuits has been relatively substantial and has involved operating the light source at higher power outputs or specific quantized frequencies for detection; or as in the case of the drop detectors, has required a movement for a detection.

An object of the present invention is to provide a more simple and lower cost light source, electro-optical detector circuit.

A second object is to provide such a detector circuit which does not require movement for a detection.

A further object to provide a detector circuit capable of operating satisfactorily with a variety of fluids from clear fluids, such as water and saline, to colored or dye containing fluids, to reasonably poor translucent fluids such as motor oil or paint pigment.

SUMMARY OF THE INVENTION

The objects of this invention are realized in a (light emitting diode) LED/photo transistor containing electro-optical detector circuit where a narrow light beam is caused to pass through a clear duct or tube containing a fluid or the absence thereof, i.e. a gas or air pocket or bubble. Detection does not depend upon fluid or bubble movement, nor is detection sensitivity dependent upon such movement.

A regulated AC pulsed signal powers the LED at any of a variety of frequencies where 60 Hz noise and 120 Hz fluorescent light noise would not interfere with detection. The LED providing pulsed light is constrained by a mechanical shroud or cover having a circular opening which narrows the light beam to approximately 50 thousands of an inch in width. A similar shroud or cover, in alignment with the LED provides an approximately 50 thousands of a inch wide reception field to the photo transistor.

A simple tone decoder receives the photo transistor output via an AC pass filter. This tone decoder feeds its output signal to alarm signal providing circuitry.

The power to the LED is adjusted with an empty tube in place between the LED and photo transistor so that the circuit barely triggers an alarm. In this condition the signal level at the input to the tone decoder is below 800 millivolts.

In this signal power region, it is postulated the photo transistor is operating in its sensitive region without being saturated or swamped by received light. When, thusly set-up and operated, the presence of a clear gas or air in the tubing within the detector region (between the LED and photo transistor) causes a relative attenuation of transmittal signal (received pick-up signal), while the presence of water or other transparent or translucent fluid causes a relative amplification of transmitted signal. Detection is therefor possible utilizing a tone decoder as a threshold detector. This operation is contrary to the previously expected method of performance of photo optical devices.

DESCRIPTION OF THE DRAWINGS

The features, advantages and operation of the invention will be understood from a reading of the following detailed description, read in conjunction with the accompanying drawings in which like numerals refer to like elements, and in which.

DETAILED DESCRIPTION OF THE INVENTION

Figure 1:
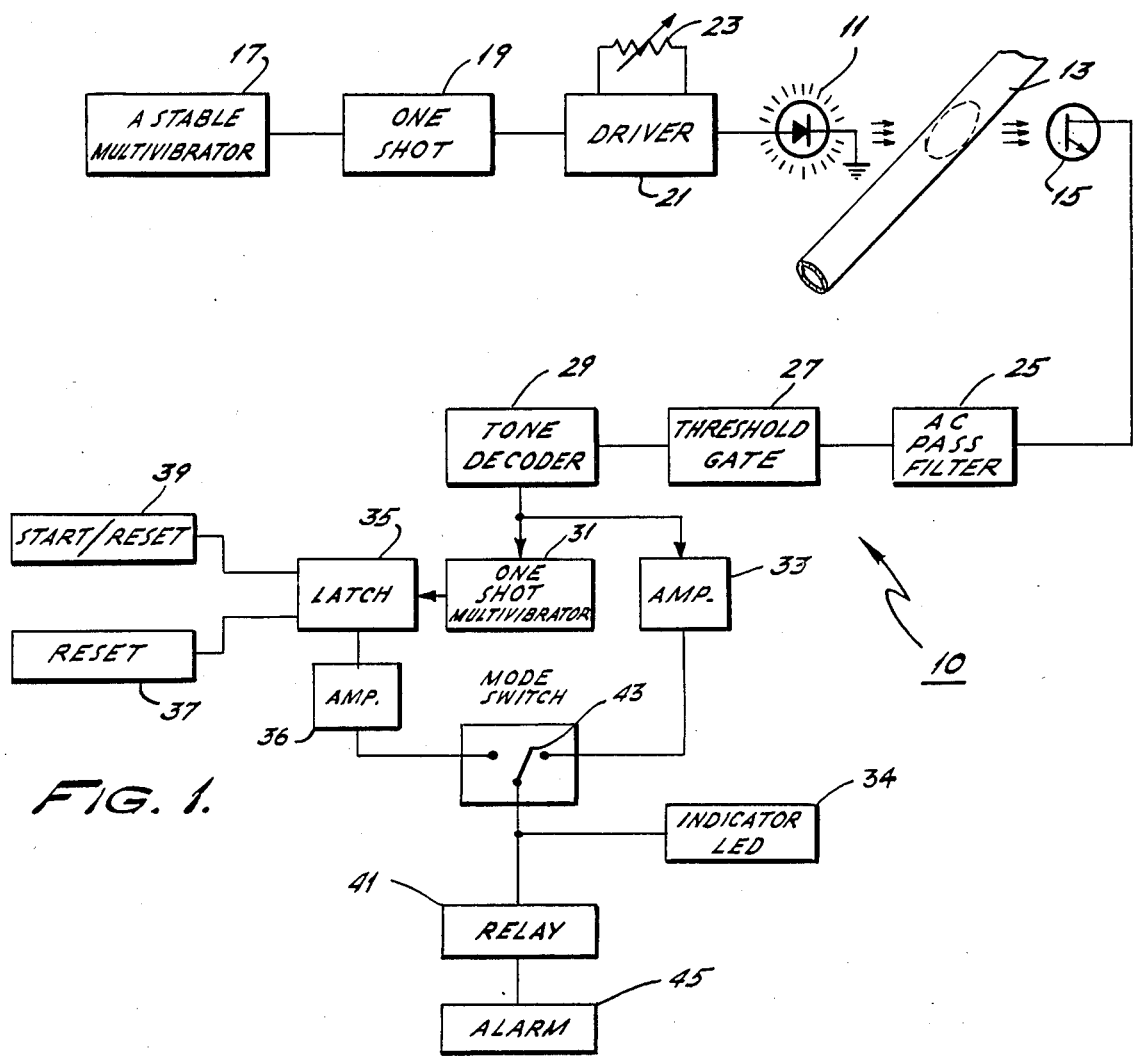
FIG. 1 is an operational block diagram of the electro-optical detector circuit invention.

An electro-optical fluid detector 10, FIG. 1, utilizes a light emitting diode (LED) 11 to send a beam of light through a clear tube 13 to be received by a photo transistor 15. The light emitting diode 11 is chosen from any of those commonly commercially available in the market place. The LED 11 may be chosen to provide red, green, amber, yellow, infrared and newly developed blue light. Likewise, the photo transistor 15 can be chosen from any of those commonly available in the market place.

For applications where the tubing 13 is less than ¼ of an inch in outside diameter, or the tubing 13 may be squeezed to a ¼ inch space, or the tubing 13 is smaller in outside diameter than ¼ of an inch, the LED 11 and photo transistor 13 can be implemented by a commercially available slotted light switch, such as that provided by Optron Division of TRW, Inc., Model OPB 818. This particular structure provides an encasement with a spacing of approximately ¼ of an inch between the juxtaposed housings containing the light emitting diode (LED) 11 and photo transistor 15. A cylindrical opening in the housing allows a 50 thousandth of an inch beam to pass from the light emitting diode 11 to the photo transistor 15.

The light emitting diode 11 is driven by an alternating current signal (AC signal) which is generated from an astable multivibrator 17 whose output is connected to a triggerable pulse generator or one-shot 19. The output from one-shot 19 is connected to an amplifier/driver circuit 21 whose output power amplification is adjustable via an adjustable resistance 23. The output of the driver circuit 21 powers light emitting diode 11. The output of oneshot 19 is set to give a pulse duration of between 85 to 150 microseconds.

The output from the photo transistor 15 is connected to an AC pass filter 25, and thence to a threshold gate 27. This threshold gate 27 is connected to feed a tone decoder 29. The output of the tone decoder 29 is amplified via a transistor 33 which drives an indicator light emitting diode 34 and may additionally drive an alarm activating a relay 41 when the mode switch 43 selects the continuous monitoring mode of operation.

In the latched mode the mode switch 43 selects the output of a one shot multivibrator 31 driven by the output of the tone decoder which sets a set, reset flip flop multivibrator (latch) 35 whose output is amplified via an output transistor amplifier 36 or the same reset circuitry 37 and initial reset or set circuitry 39 is connected to the latch driver 35.

An output from the amplifier 33 or the latch 35 and amplifier 36 will power a relay 41 through a mode selector switch 43. Alarm components 45 are driven by the relay 41. These alarm components 45 may include signal lights and audible alarms such as bells or buzzers or other signalling apparatus.

Figure 2:
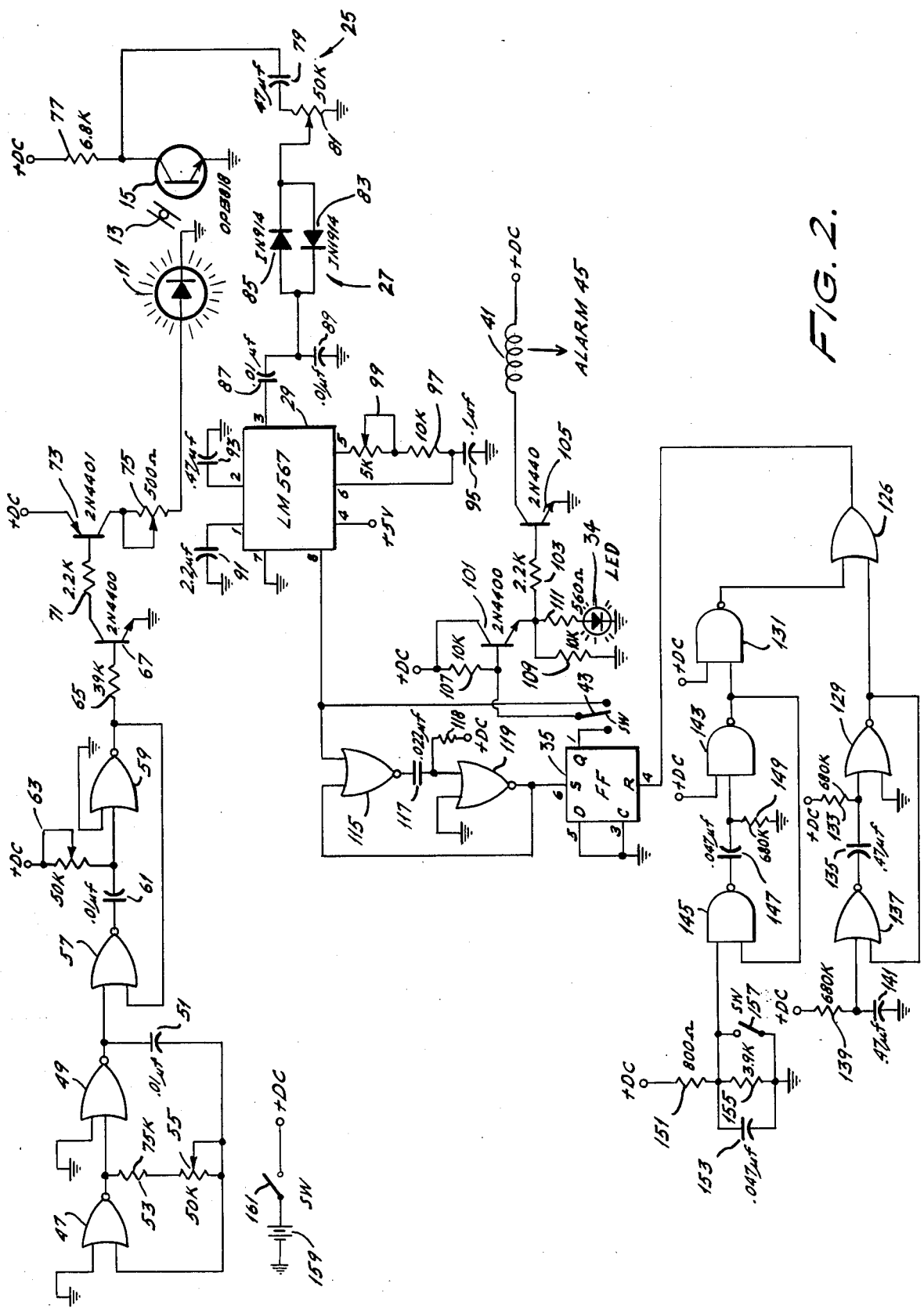
FIG. 2 is a detailed circuit diagram of the detector of FIG. 1.

A detailed circuit diagram for implementing the detector 10 of FIG. 1 is shown in FIG. 2.

The astable multivibrator 17 is implemented with a pair of NOR gates 47, 49 connected in series. The first input of each NOR gate 47, 49 is connected to ground. The output from NOR gate 49 is connected through a 0.01 microfarad capacitor 51 to the second input of the NOR gate 47. The output from the NOR gate 47 is connected directly to the second input of the NOR gate 49 as well as to its own second input via the series connection of a 75K ohm resistor 53 and a variable 50K ohm resistor 55.

One shot 19 is implemented by a second serially connected pair of NOR gates 57, 59. The first input to NOR gate 57 is connected directly to the output of NOR gate 49 while the second input to the NOR gate 57 is connected to the output of the NOR gate 59. The output of the NOR gate 57 is connected through a 0.01 microfarad capacitor 61 to the second input to the NOR gate 59. The second input to the NOR gate 59 is also connected to +DC voltage through a variable resistor 63 whose maximum value is 50K. This resistor 53 is identical to the resistor 55.

The output from the NOR gate 59 is connected through a 39K ohm resistor 65 to the base of an NPN transistor 67, said transistor 67 being connected emitter to ground. This transistor 67 can be implemented by any of a group of commercially available devices, including a type 2N4400 transistor supplied by Texas Instruments, National Semiconductor and many other vendors.

The collector of the transistor 67 is connected through a 2.2K ohm resistor 71 to the base of a PNP transistor 73. This transistor 73 is connected with its emitter to +DC voltage and its collector through a 500 ohm variable resistor 75 to the light emitting diode 11.

Photo transistor 15 has its emitter connected to ground and its collector connected through a 6.8K ohm resistor 77 to +DC voltage. The collector of the transistor 13 is also connected to the AC pass filter which is formed by a 47 microfarad capacitor 79 and a variable 50K ohm resistor 81, this resistor 81 being connected between the capacitor 79 and ground, the wiper of this resistor 81 is connected to the threshold gate 27 of FIG. 1, formed by back to back parallel connections of two diodes 83, 85. The diodes are commonly available as model IN914.

The common connection between the diodes 83, 85 is capacitor coupled to an input of a tone decoder 29. This connection is effected through a pair of 0.01 microfarad capacitors 87, 89, with the connection through the first capacitor 87 being directly into the input of the tone decoder 29 and the other capacitor 89 being connected to ground.

Tone decoder 29 is available from National Semiconductor Corporation as Model No. LM567. The input pin 3 of this tone decoder 29 is connected to the capacitor 87. The tone decoder 29 requires a +5 DC voltage on its input pin 4 and a ground connection to its input pin 7. Two capacitors are needed, a first capacitor 91 is tied to pin 1. This capacitor 91 has a value of 2.2 microfarads. A second 0.47 microfarad capacitor 93 is connected to pin 2 of the tone decoder 29. Both capacitors are tied to ground. The proper choice of these capacitor 91, 93 values sets the band width. The center frequency of the tone decoder is set with a 0.1 microfarad capacitor 95 connected to ground and pin 6. Pin 6 is also connected to pin 5 through the series connection of a 10K ohm resistor 97 and a variable resistor 99 having a value of 5K ohms.

The output pin 8 of the tone decoder 29 is connected through an NPN transistor 101, a 2.2K ohm resistor 103 and a second NPN transistor 105 to activate a relay 41. This relay 41 drives all and any of the sundry alarm devices 45 connected as part of the apparatus.

Transistors 101 and 105 are connected in a typical Darlington amplifier circuit fashion with the collector of the transistor 105 in the relay 41 circuit and the emitter of the transistor 105 connected to ground. Both transistors 101, 105 are type 2N4400, commonly available in the market place. Transistor 101 has its collector connected to +DC voltage, and is driven by an open collector output transistor contained in the tone decoder integrated circuit 29, connected to the +DC voltage through a pull up resistor 107. The emitter of this transistor 101 is connected to ground through a parallel circuit comprising a 10K ohm resistor 109, in one leg, and the series connection of a 560 ohm resistor 111 and a light emitting diode 113 in the other leg. This diode is used as a visual indicator for initial set up of the device.

The output pin 8 of the tone decoder 29 is also connected into a one shot multivibrator composed of a NOR gate 115, whose output is connected through a 0.022 microfarad capacitor 117 and pullup timing resistor 118 to a first input of another NOR gate 119. This first input of this NOR gate 119 is also connected to +DC voltage, while its second input is connected to ground. The output of this NOR gate 119 is connected to the second input of the NOR gate 115, as well as, to the "set" input of a D type FLIP FLOP 121. The "D" and "C" inputs to this FLIP FLOP 121 are each connected to ground, while the "Q" output is connected through a switch 123 to the amplifier 101 to provide a latching output.

The "reset" input to this FLIP FLOP 121 is connected to the output of an OR gate 126.

OR gate 126 is used to reset flip-flop 121 by passing either a pulse generated from the reset switch 157 driving a negative triggered one shot composed of nand gates 145 and 143 in combination with resistor 149 and capacitor 147, inverting the negative going output by means of NAND gate 131 which provides one input to the OR gate 126.

The other input to OR gate 126 is from a one shot multivibrator which produces a positive going pulse when the unit is turned on. More specifically when the device is initially powered a 0.47 uf capacitor 141 is charged through 680K resistor 139. When capacitor 141 charges to roughly ½ +DC (+2.5 VDC) the threshold of NOR gate 137 is reached and a positive going pulse is produced at the output of NOR gate 129. The duration of the pulse is determined by approximately the equation of: time (pulse)=0.69RC; where R=680K(133) and C=0.47×10$^{-6}$ F(141).

A battery or other +DC source 159 supplies +DC power to the circuit through a master power switch 161. The battery 159 can have any value between +5 and +15 volts for the circuit to operate adequately. The only power constraint, as was previously mentioned, is the +5 DC voltage needed on pin 4 of the tone decoder 29.

The amplifier circuit 33 of FIG. 1 is implemented with the transistor driver 101, 105 and attendant circuitry of FIG. 2. The FLIP FLOP 121 and attendant circuitry implements the latch driver 35 of FIG. 1. The switch connection 43 of FIG. 1 is effected through switch 123 in FIG. 2, while the reset function circuitry 37 of FIG. 1 is implemented by the switch 157 and NAND gate circuitry 145, 143, 131 et al of FIG. 2. The initial start/reset circuitry 39 of FIG. 1 is implemented through the NOR gate circuitry 137, 129 et al of FIG. 2. A "high" signal on the reset pin of FLIP FLOP 121 causes the set pin Q to go high which forces the output of transistor 101 to go high which in turn passes current through the emitter base junction of transistor 105 which causes the transistor to saturate turning on the relay alarm 41.

When the master power switch 161 is first closed, the circuit will charge up and automatically reset the FLIP FLOP 121 as described earlier.

Closing the switch 157 will eventually cause a high on the reset pin of FLIP FLOP 121, which like the initializing state will cause the set pin to go to zero turning off transistor 101. The switch 157 therefore is the circuit reset switch for the latched signal side of the circuit. This latched signal side of the circuit occurs when a low appears on the output of the tone decoder 29, pin 8 which as an open collector transistor output provides an input to a positive triggered one shot multivibrator composed of NOR gates 115, 119 and resistor 118 in combination with capacitor 117. The output of the multivibrator sets the flip-flop 121 and when this output is selected by switch 123 whose common position is brought to the base of transistor 101, causing conduction and resulting in an activation of the relay 141. This state will continue until the switch 157 is thrown which will then reset the FLIP FLOP 121 and change the state of the output Q. The switch 123 implements the switch 43 of FIG. 1. When this switch 123 is moved to the "Q" output of the FLIP FLOP 121, this output will appear at the base of transistor 101 and provide a latched or fixed state. When switch 123 is closed connecting the output of the tone decoder 29 to the base of transistor 101 a low state at pin 8 will turn off transistor 101 and its following circuitry, while a high state will turn on transistor 101 and its following circuitry thereby providing a continuous monitoring of the electro-optical inputs which is characterized by an intermittent output in response to changing or detected electro-optical input.

It is intended that the circuit be operated in a phase lock mode. To accomplish this the variable resistor 55 is adjusted to adjust the pulse frequency of the output of the astable multivibrator 17, i.e. the output of NOR gate 49. Phase locking is accomplished when the variable resistor 99 connected to the tone decoder 29 is adjusted to set the center frequency of the tone decoder 29 at the identical frequency of the output of the astable multivibrator. While the detector will work adequately at any frequency between 2 Hz and 100K Hz, a frequency of about 700 to 777 Hz is preferably chosen for the pulse rate generated by the astable multivibrator 17 over an acceptable frequency from the range of 150 Hz to 12000 Hz. The same frequency is chosen as the mean or center frequency for the tone decoder 29.

It is very important, perhaps critical, to run the photo transistor 13 in the non-saturated state. To do this, the circuit is empirically adjusted as to the intensity of the light emitting diode 11. To do this, the resistor 75 is adjusted so that the signal strength at the AC pass filter 25, i.e. at the common point between the capacitor 79 and the resistor 81, is in the range of from 400 to 800 millivolts. This adjustment is made once the frequency of the astable multivibrator 17 and tone decoder 29 are set. The adjustment on the resistor 75 is made with an empty air space between the LED 11 and the photo transistor 13. Once this adjustment is made, the sensitivity of the pickup portion of the circuitry is adjusted with the resistor 81 so that the signal strength is approximately 100 millivolts on the input pin 13 of the tone decoder 29.

The one shot 19 pulse output width is adjusted by the resistor 63. It is preferred that the pulse width of the output pulses at the output of the NOR gate 59 be very narrow. The pulse width from the one shot 19 may be variably adjusted to a value within the range of 0 to 500 microseconds. The adjustment can provide a 100 microsecond pulse width for operating satisfactorily in detecting air bubbles in a fluid. However, other preferable pulse widths could be chosen and could vary as a function of the gas to be detected in the fluid. Likewise, adjustments could be made in the type of light generated by the light emitting diode 11. An infrared or red light emitting diode 11 would work well with dark fluids such as motor oil, dyed water and paint pigments. A proper choice of frequencies and colors emitted by the light emitting diode 11 can be empirically determined as a function of the substance being detected and as a function of the carrier substance. The substance to be detected would have a lower optical densty than the carrier substance.

Typically, a final adjustment on the sensitivity of the detector is made so that resistor 81 is adjusted to the point where with a tubing inserted between the light emitting diode 11 and photo transistor 13, the alarm 45 just goes on.

The device operates contrary to the expected laws of physics. By this it is meant that the signal transmission as determined by the pick-up photo transistor 15 output is greater when the light passes a fluid filled tube than when it passes an air or gas filled tube. It is immaterial whether the tubing 13, FIG. 1, is greater in diameter than the physical space between the photo transistor 15 and the light emitting diode 11 or whether very small tubing 13 is used. As an example, ⅜ of an inch ID tubing, which because it is flexible, was forced between the light emitting diode 11 and the photo transistor 15 worked equally well and provided identical circuit response and detection as a very small tubing such as 0.01 inch OD tubing or 0.02 inch OD tubing placed to intercept the light beam from light emitting diode 11.

Figure 3:
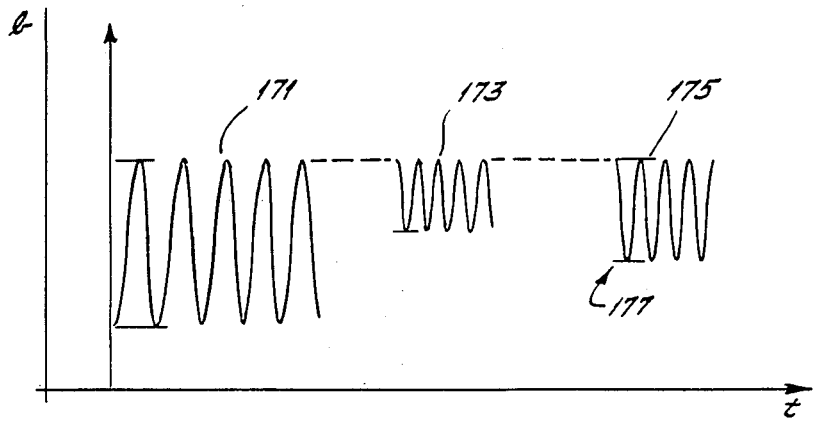
FIG. 3 is a signal diagram of various pick-up signals at the input to the tone decoder circuit component of FIGS. 1 and 2.

FIG. 3 shows the signal which can be read at the input to the tone decoder 29, as seen on an oscilloscope. The largest amplitude signal 171 represents the signal when the space between the light emitting diode 11 and photo transistor 13 is empty. The smallest amplitude signal 173 represents the signal received when the space is filled with a tube or tubing, this tubing being empty or having an air pocket therein in the region of the light beam. The middle amplitude signal 175 represents the signal received when the tubing has water or a translucent fluid including motor oil or blue dyed water in the tubing.

The amplitude threshold 177 is set by the procedure described above. When the signal shrinks below this amplitude an alarm condition occurs.

Different theories can be expounded as to why the various signal amplitudes 171, 173, 175 occur or come out as they do. One possible explanation is that the tubing acts as a fiber optic transmitter. When it is empty the narrow beam of light enters normal to the surface of the tubing, regardless of the size of the tubing. When the tubing is filled with a fluid, perhaps it minimizes surface reflections which allows better transmission through the tubing to the photo transistor 15. When the tubing is empty, part of the light passes into the interior of the tubing where it is bounced around and refracted into directions other than in direct alignment with the receiving port, i.e. opening for the photo transistor 15. A second theory is that at the precise repetition rate and duration time for the light pulses generated by the light emitting diode 11, the transmission through a clear fluid or translucent fluid is more efficient than through air.

Changes can be made in the structure and operation of the subject invention without departing from the intent and scope thereof. Some variations have already been discussed above. It is intended, therefore, that the above disclosure be considered as illustrative of the invention and not be read in the limiting sense.

What is claimed is:

1. An electro-optical fluid detector capable of sensing the presence and absence of fluid in a clear tube, comprising:
    means for pulsing a light emitting source at an adjustably fixed repetition rate and pulse duration, said means including a light source, said light emitted therefrom being shaped into a narrow beam 0.050 inches in diameter;
    photo sensing means for detecting said light beam from said emitting source, said sensing means including a photo transistor operating in its unsaturated active switching region of operation, said detecting means generating an alarm signal;
    tone decoder means for reacting to a pre-determined frequency of said pulsed light connected to said sensing means; and
    wherein said clear tube is disposed to intercept said emitted narrow beam of light.

2. The detector of claim 1 wherein said pulsing means powers said light emitting source with relatively short pulse-width with a time duration of 85 to 150 microseconds.

3. The detector of claim 2 wherein said pulsing means powers said light emitting source at a frequency of from 2 Hz to 100K Hz.

4. The detector of claim 3 wherein said photo sensing means is tuned to operate at the same frequency as said pulsing means.

5. The detector of claim 4 wherein said pulsing means includes a source of pulses preferably in the range of 700–777 Hz.

6. The detector of claim 5 wherein said photo sensing means includes:
    an AC-pass filter connected to said photo transistor output;
    a threshold gate connected to said AC-pass filter output;
    said tone decoder means comprising a tone decoder capacitively coupled to said threshold gate output, said tone decoder being adjusted to operate at a center frequency equal to the range of said pulse source; and
    means for generating an alarm signal, said alarm signal generating means being connected to said tone decoder output.

7. The detector of claim 6 wherein said source of pulses is an astable multivibrator and wherein said pulsing means also includes a one-shot multivibrator connected to be triggered by said astable multivibrator; and a driver circuit powered from said one-shot multivibrator, said driver circuit having an output powering said light emitting source.

8. The detector of claim 7 wherein said light emitting source is a light emitting diode connected to said driver circuit output.

9. The detector of claim 8 wherein said means for generating an alarm signal includes:
    an amplifier circuit connected to said tone decoder output;

a relay connected to said amplifier circuit output; and
at least one signaling component powered by said relay.

10. The detector of claim 9 wherein said astable multivibrator is adjustable as to frequency and is said source of said pulses in said preferable range of 700-777 Hz.

11. The detector of claim 10 wherein said one-shot is adjustable as to pulse duration and provides pulses at said astable multivibrator frequency, said one-shot output pulse duration being about 100 micro seconds.

12. The detector of claim 11 wherein said driver circuit output powers said light emitting diode so that said photo transistor output is in the approximate range of 400-800 millivolts.

13. The detector of claim 12 wherein said AC-pass filter includes a variable resistance to ground, said resistance being setable to effect the input sensitivity of said tone decoder.

14. A method of detecting lower density bubbles, such as air or gas bubbles, in a fluid carried in transparent or translucent tubes, comprising the following steps:
generating a plurality of pulses at a repetition frequency within the range of 150 Hz to 1200 Hz by using an astable multivibrator with a predetermined frequency;
shaping each of said generated pulses by limiting each pulse duration to a range of 50 to 500 microseconds;
powering a light emitting diode with said shaped pulses to form a beam of light;
restricting said beam to a pre-determined diameter;
passing said beam of light through said tube;
detecting said beam of light passed through said tube with a photo transistor;
monitoring the output of said photo transistor for the amplitude of said transistor's output with a tone decoder calibrated to said predetermined frequency; and
alarming when said output falls below a predetermined threshold.

15. The method of claim 14 also including limiting the amplitude of each said shaped pulses to said light emitting diode to operate said photo transistor in its active, unsaturated region.

16. The method of claim 15 wherein said limiting the amplitude of each said shape pulses step includes adjusting the amplitude of each said pulses to said light emitting diode until said photo transistor output is approximately in the range of 400 to 800 millivolts.

17. The method of claim 16 wherein the step of monitoring by using a tone decoder includes adjusting the input sensitivity of said tone decoder to a signal level of approximately 100 millivolts when said photo transistor output signal level is approximately 400 to 800 millivolts.

18. The method of claim 17 wherein the step of shaping each of said generated pulses limits each said pulse duration to 100 microseconds.

19. The method of claim 18 wherein said generated pulses are generated at a repetition frequency within the range of 700-777 Hz.

* * * * *